(12) United States Patent
Chen (10) Patent No.: US 12,269,219 B2
(45) Date of Patent: *Apr. 8, 2025

(54) WELDED THERMOPLASTIC HYBRID COOLER AND METHOD OF MANUFACTURING SAME

(71) Applicant: Evolution Outdoor LLC, Kilgore, TX (US)

(72) Inventor: Guoping Chen, Fujian Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/208,524

(22) Filed: Jun. 12, 2023

(65) Prior Publication Data

US 2023/0321924 A1  Oct. 12, 2023

Related U.S. Application Data

(63) Continuation of application No. 17/059,526, filed as application No. PCT/CN2018/088627 on May 28, 2018, now Pat. No. 11,673,344.

(51) Int. Cl.
*B65D 81/38* (2006.01)
*B29C 65/18* (2006.01)
(Continued)

(52) U.S. Cl.
CPC .............. *B29C 65/62* (2013.01); *B29C 65/18* (2013.01); *B65D 81/3813* (2013.01); *F25D 23/087* (2013.01)

(58) Field of Classification Search
CPC .... B65D 81/3813; B65D 31/04; B65D 33/02; F25D 23/087
(Continued)

(56) References Cited

U.S. PATENT DOCUMENTS

| 258,393 A | 5/1882 | Endicott |
|---|---|---|
| 1,482,678 A | 2/1924 | Figley |

(Continued)

FOREIGN PATENT DOCUMENTS

| CN | 101066048 A | 11/2007 |
|---|---|---|
| CN | 101088330 A | 12/2007 |

(Continued)

OTHER PUBLICATIONS 5.11 Tactical 56298-092-1SZ-UCR 13.7L Storm Tactical Sling Bag; unknown first available date, recreationid.com [online], [site visited Nov. 24, 2020], Available from internet U RL:https://www.recreationid.com/511tactical/ucr-13-7-I-storm-tactical-sling-bag-mpn-56298-092-1-sz.html (Year: 2020).

(Continued)

*Primary Examiner* — Stephen J Castellano
(74) *Attorney, Agent, or Firm* — Think Differently Legal, PLLC; J. Andrew Reed (57) ABSTRACT

An insulated cooler comprises a body and a lid at least partially connected to the body, where each is comprised of soft thermoplastic material. The body includes a base comprising rigid plastic connected to the body via a first thermoplastic sealing strip heat welded to the bottom edges of the body, and sewn to top edges of the base. The lid includes a top comprising rigid plastic connected to top edges of the lid via a second thermoplastic sealing strip heat welded to the top edges of the lid, and sewn to bottom edges of the top. The cooler also includes a waterproof liner disposed along inner surfaces of the body and the lid, insulation disposed between the liner and the body and lid, and a zipper closing the lid to the body. A method of manufacturing an insulated cooler is also disclosed. This is helpful for transporting cooler conveniently and increasing the capabilities of the cooler.

20 Claims, 9 Drawing Sheets

(51) Int. Cl.
  *B29C 65/62* (2006.01)
  *F25D 23/08* (2006.01)
(58) Field of Classification Search
  USPC ............... 383/121.1, 119, 110; 220/678, 677
  See application file for complete search history.

(56) References Cited

U.S. PATENT DOCUMENTS

| | | |
|---|---|---|
| 1,791,346 A | 2/1931 | Burch et al. |
| D94,404 S | 1/1935 | Calpha |
| 2,028,339 A | 1/1936 | Abraham et al. |
| 2,102,977 A | 12/1937 | Shoemaker et al. |
| 2,316,833 A | 4/1943 | Baron |
| 2,554,668 A | 5/1951 | Charles |
| 2,595,463 A | 5/1952 | Kamps |
| 2,616,209 A | 11/1952 | Ploen |
| 2,717,470 A | 9/1955 | Holdeman |
| 2,730,833 A | 1/1956 | Newell |
| 2,956,365 A | 10/1960 | Smith et al. |
| 2,987,846 A | 6/1961 | Powell |
| 3,047,349 A | 7/1962 | Powell |
| 3,122,225 A | 2/1964 | Ward |
| 3,122,725 A | 2/1964 | Romano |
| 3,181,751 A | 5/1965 | Wilson |
| RE25,826 E | 8/1965 | Ward |
| 3,310,271 A | 3/1967 | King |
| 3,481,066 A | 12/1969 | Woolworth |
| 3,564,755 A | 2/1971 | Lindgren, Sr. |
| 3,813,138 A | 5/1974 | Doohan |
| 3,850,396 A | 11/1974 | Orlandi |
| 3,985,409 A | 10/1976 | Kneier |
| 4,023,304 A | 5/1977 | Singer |
| 4,151,938 A | 5/1979 | Barker et al. |
| 4,176,491 A | 12/1979 | Herring |
| D257,651 S | 12/1980 | Katz et al. |
| 4,240,222 A | 12/1980 | Covington |
| 4,245,422 A | 1/1981 | Souza |
| 4,324,446 A | 4/1982 | LeSage |
| D280,260 S | 8/1985 | Leiserson |
| D284,333 S | 6/1986 | Huston |
| D284,620 S | 7/1986 | Calton |
| D291,149 S | 8/1987 | Smith |
| 4,739,886 A | 4/1988 | Seaberg |
| 4,769,941 A | 9/1988 | Schmidt |
| D299,587 S | 1/1989 | Thomas |
| 4,811,996 A | 3/1989 | Hansson |
| 4,854,432 A | 8/1989 | Carpenter et al. |
| 4,958,730 A | 9/1990 | Bunten |
| D311,452 S | 10/1990 | Ehret |
| D312,530 S | 12/1990 | Gallen et al. |
| 5,054,669 A | 10/1991 | Zimbardi et al. |
| 5,087,105 A | 2/1992 | White |
| D333,038 S | 2/1993 | Collins |
| D336,218 S | 6/1993 | Hague |
| 5,217,119 A | 6/1993 | Hollingsworth |
| D341,026 S | 11/1993 | Barker |
| 5,261,529 A | 11/1993 | Holland |
| D347,521 S | 6/1994 | Elliott |
| D349,191 S | 8/1994 | Mason |
| D352,827 S | 11/1994 | Schildkraut |
| 5,386,662 A | 2/1995 | Vader et al. |
| D360,182 S | 7/1995 | Lovett |
| 5,454,477 A | 10/1995 | Bornhorst et al. |
| D368,370 S | 4/1996 | Tawil |
| 5,505,297 A | 4/1996 | Myers |
| D371,051 S | 6/1996 | Melk |
| D371,052 S | 6/1996 | Melk |
| 5,526,907 A | 6/1996 | Trawick |
| 5,526,927 A | 6/1996 | McLemore |
| D371,724 S | 7/1996 | Melk |
| 5,556,068 A | 9/1996 | Gorelik |
| D376,044 S | 12/1996 | Trawick et al. |
| 5,606,820 A | 3/1997 | Suddeth |
| D381,871 S | 8/1997 | Melk |
| D382,108 S | 8/1997 | Wheeler |
| D383,601 S | 9/1997 | Jones et al. |
| 5,676,223 A | 10/1997 | Cunningham |
| D387,626 S | 12/1997 | Melk |
| D389,305 S | 1/1998 | Hauschild |
| D394,552 S | 5/1998 | Melk |
| 5,762,170 A | 6/1998 | Shyr et al. |
| 5,769,260 A | 6/1998 | Killinger et al. |
| 5,772,066 A | 6/1998 | Reynolds |
| D396,745 S | 8/1998 | Peterson |
| D398,083 S | 9/1998 | Martz |
| D401,062 S | 11/1998 | Hauschild |
| 5,829,185 A | 11/1998 | Myers |
| 5,908,147 A | 6/1999 | Chuang |
| D412,269 S | 7/1999 | Wyant |
| D414,932 S | 10/1999 | Platte, III |
| D416,680 S | 11/1999 | Latshaw |
| D423,779 S | 5/2000 | Goatcher |
| D427,768 S | 7/2000 | Bogert |
| D434,901 S | 12/2000 | Eskandry |
| D435,343 S | 12/2000 | Eskandry |
| D435,863 S | 1/2001 | Eskandry |
| D439,047 S | 3/2001 | Holland et al. |
| 6,202,865 B1 | 3/2001 | Kuo |
| 6,202,910 B1 | 3/2001 | Swetish |
| 6,290,040 B1 | 9/2001 | Chen |
| 6,321,912 B1 | 11/2001 | Lippert et al. |
| D452,806 S | 1/2002 | King |
| 6,454,097 B1 | 9/2002 | Blanco |
| D465,086 S | 11/2002 | Watts |
| D465,134 S | 11/2002 | Joss |
| D468,101 S | 1/2003 | Hassett |
| D469,606 S | 2/2003 | Su |
| D471,012 S | 3/2003 | Peterson |
| 6,530,475 B1 | 3/2003 | Penney |
| D472,380 S | 4/2003 | Hillman |
| D472,386 S | 4/2003 | Bauer |
| D474,598 S | 5/2003 | Platte, III |
| D476,480 S | 7/2003 | Hillman |
| 6,595,604 B1 | 7/2003 | Peterson |
| 6,612,434 B1 | 9/2003 | Redzisz |
| D481,204 S | 10/2003 | Rada |
| D482,525 S | 11/2003 | Fair |
| D482,842 S | 12/2003 | Fair |
| D484,695 S | 1/2004 | DePalma |
| D485,144 S | 1/2004 | Levine et al. |
| D487,189 S | 3/2004 | Ukitsu et al. |
| D487,191 S | 3/2004 | Ong |
| D492,160 S | 6/2004 | Lanman et al. |
| 6,742,636 B2 | 6/2004 | Godshaw |
| D495,489 S | 9/2004 | Messina-Brown |
| 6,821,019 B2 | 11/2004 | Mogil |
| D500,923 S | 1/2005 | Gonzalez et al. |
| D504,229 S | 4/2005 | Duvigneau |
| D506,061 S | 6/2005 | McGibben |
| D507,734 S | 7/2005 | Willems |
| 6,926,136 B1 | 8/2005 | Lynch-Bass |
| D514,317 S | 2/2006 | Conforti |
| D528,295 S | 9/2006 | Harvey |
| D530,089 S | 10/2006 | Silverman |
| 7,162,890 B2 | 1/2007 | Mogil et al. |
| D542,031 S | 5/2007 | Zapata |
| D542,527 S | 5/2007 | Zapata |
| 7,240,513 B1 | 7/2007 | Conforti |
| D552,350 S | 10/2007 | Bosley |
| D556,452 S | 12/2007 | Hydon |
| D560,450 S | 1/2008 | Tagliati et al. |
| D566,393 S | 4/2008 | Kidakarn |
| D574,615 S | 8/2008 | Picot et al. |
| D584,046 S | 1/2009 | Montague |
| 7,568,566 B2 | 8/2009 | D'Ambrosio |
| 7,604,103 B2 | 10/2009 | Hamlin |
| D603,169 S | 11/2009 | Smith |
| 7,621,074 B2 | 11/2009 | Glidewell et al. |
| D620,254 S | 7/2010 | Noraker |
| 7,837,032 B2 | 11/2010 | Smeltzer |
| D634,543 S | 3/2011 | Scicluna et al. |
| D634,601 S | 3/2011 | Good |
| 7,937,884 B1 | 5/2011 | Naylor et al. |
| 7,941,965 B2 | 5/2011 | Hoover |

(56) References Cited

U.S. PATENT DOCUMENTS

| | | |
|---|---|---|
| D639,051 S | 6/2011 | Dare |
| D647,301 S | 10/2011 | Sosnovsky |
| 8,043,004 B2 | 10/2011 | Mogil |
| D648,533 S | 11/2011 | Sosnovsky |
| D660,589 S | 5/2012 | Ayjian |
| D663,944 S | 7/2012 | Bouskill |
| 8,327,659 B2 | 12/2012 | Winkler et al. |
| 8,348,510 B2 | 1/2013 | Mogil |
| D676,652 S | 2/2013 | Holloway et al. |
| 8,453,813 B2 | 6/2013 | Lai |
| D692,661 S | 11/2013 | Gupton |
| D692,662 S | 11/2013 | Pignotti |
| 8,621,720 B2 | 1/2014 | Kao et al. |
| D714,541 S | 10/2014 | Anderson et al. |
| D720,216 S | 12/2014 | Luburic et al. |
| 8,899,071 B2 | 12/2014 | Mogil |
| D724,318 S | 3/2015 | Myer |
| D725,908 S | 4/2015 | Zwetzig |
| D739,653 S | 9/2015 | Majeau et al. |
| 9,144,281 B2 | 9/2015 | Cross |
| D742,637 S | 11/2015 | Miles |
| D748,918 S | 2/2016 | Majeau |
| D761,564 S | 7/2016 | Rhodes |
| D762,384 S | 8/2016 | Boroski |
| D762,978 S | 8/2016 | Boroski |
| 9,462,874 B1 | 10/2016 | Samuel |
| D779,824 S | 2/2017 | Boroski |
| D781,575 S | 3/2017 | Etekochay |
| D787,816 S | 5/2017 | Slimane |
| D793,728 S | 8/2017 | Faibish et al. |
| D796,188 S | 9/2017 | Ho et al. |
| D802,913 S | 11/2017 | Tien |
| 9,854,897 B1 | 1/2018 | Pelkey, Jr. et al. |
| D811,727 S | 3/2018 | Quehl et al. |
| D818,204 S | 5/2018 | Renforth |
| D821,097 S | 6/2018 | Burton et al. |
| D824,170 S | 7/2018 | Tobias |
| D831,952 S | 10/2018 | Pennington |
| D832,653 S | 11/2018 | Waskow et al. |
| D833,141 S | 11/2018 | Carter et al. |
| D835,473 S | 12/2018 | Jacobsen |
| D835,950 S | 12/2018 | Jacobsen |
| 10,143,282 B2 | 12/2018 | Seiders et al. |
| D836,999 S | 1/2019 | Jacobsen |
| D837,000 S | 1/2019 | Jacobsen |
| D837,001 S | 1/2019 | Jacobsen |
| D838,971 S | 1/2019 | Deanda |
| D843,107 S | 3/2019 | Swaggart |
| D844,324 S | 4/2019 | Hoppe et al. |
| D845,613 S | 4/2019 | Decker |
| D849,398 S | 5/2019 | Tan |
| D856,662 S | 8/2019 | Breines |
| D862,528 S | 10/2019 | Sullivan et al. |
| 10,477,991 B1 | 11/2019 | Fragala |
| D873,090 S | 1/2020 | Jacobsen |
| D874,129 S | 2/2020 | Goldstein |
| D875,385 S | 2/2020 | Carter et al. |
| D880,253 S | 4/2020 | Jacobsen |
| D881,655 S | 4/2020 | Jacobsen |
| D887,135 S | 6/2020 | Tan |
| D887,136 S | 6/2020 | Tan |
| D888,413 S | 6/2020 | Dai |
| D889,821 S | 7/2020 | Xu |
| D890,517 S | 7/2020 | Smith |
| D893,183 S | 8/2020 | Eisenhardt et al. |
| D896,504 S | 9/2020 | Li |
| D896,505 S | 9/2020 | Yuan |
| D896,514 S | 9/2020 | Tan |
| D898,349 S | 10/2020 | He |
| D899,079 S | 10/2020 | Priest |
| D901,882 S | 11/2020 | Tan |
| 10,881,178 B2 | 1/2021 | Johnson |
| D912,974 S | 3/2021 | Breines |
| D915,762 S | 4/2021 | Li |
| D915,770 S | 4/2021 | Breines |
| D919,287 S | 5/2021 | He |
| D920,744 S | 6/2021 | Eisenhardt et al. |
| D922,061 S | 6/2021 | Tan |
| D922,062 S | 6/2021 | Shi |
| D927,174 S | 8/2021 | Dai |
| D927,261 S | 8/2021 | Rong |
| 11,076,666 B2 | 8/2021 | Sullivan et al. |
| D930,360 S | 9/2021 | Cai |
| D931,600 S | 9/2021 | Huang |
| D932,179 S | 10/2021 | Mukri |
| D938,716 S | 12/2021 | Tan |
| D938,717 S | 12/2021 | Tan |
| D938,722 S | 12/2021 | Tan |
| D939,209 S | 12/2021 | Tan |
| D941,577 S | 1/2022 | Fernandes |
| D941,578 S | 1/2022 | Fernandes |
| D944,004 S | 2/2022 | Tan |
| D944,008 S | 2/2022 | Tan |
| 11,242,189 B2 | 2/2022 | Rogers |
| D947,524 S | 4/2022 | Tan |
| D964,021 S | 9/2022 | Wu |
| D964,123 S | 9/2022 | Peng |
| D979,244 S | 2/2023 | Luo |
| 11,673,344 B2 * | 6/2023 | Chen .................. B65D 81/3813 220/592.16 |
| D993,616 S | 8/2023 | Tan |
| 2001/0042665 A1 | 11/2001 | Siwak |
| 2002/0181806 A1 | 12/2002 | Godshaw et al. |
| 2003/0234269 A1 | 12/2003 | Shamas |
| 2004/0065573 A1 | 4/2004 | Brouard |
| 2004/0149600 A1 | 8/2004 | Wolter et al. |
| 2005/0016648 A1 | 1/2005 | Vakharia et al. |
| 2005/0077135 A1 | 4/2005 | Drew et al. |
| 2005/0082132 A1 | 4/2005 | Smith |
| 2005/0121275 A1 | 6/2005 | Platte |
| 2005/0161483 A1 | 7/2005 | Krohn |
| 2005/0263364 A1 | 12/2005 | Sher |
| 2005/0263527 A1 | 12/2005 | Maldonado et al. |
| 2005/0279124 A1 | 12/2005 | Maldonado |
| 2006/0064852 A1 | 3/2006 | Willems |
| 2007/0011939 A1 | 1/2007 | Sakai |
| 2007/0214613 A1 | 9/2007 | Shiao |
| 2007/0226966 A1 | 10/2007 | Tominaga |
| 2007/0228097 A1 | 10/2007 | Recanati |
| 2007/0237432 A1 | 10/2007 | Mogil |
| 2007/0245521 A1 | 10/2007 | Chehebar |
| 2008/0029666 A1 | 2/2008 | Hurt |
| 2008/0116026 A1 | 5/2008 | Bass et al. |
| 2008/0121554 A1 | 5/2008 | Townsend |
| 2008/0164265 A1 | 7/2008 | Conforti |
| 2008/0289925 A1 | 11/2008 | Sapyta |
| 2009/0301911 A1 | 12/2009 | Rubin |
| 2012/0043228 A1 | 2/2012 | Ezzo et al. |
| 2012/0286011 A1 | 11/2012 | Wegener |
| 2013/0043293 A1 | 2/2013 | Connell |
| 2013/0068776 A1 | 3/2013 | Patterson |
| 2013/0145581 A1 | 6/2013 | Bailey |
| 2014/0132131 A1 | 5/2014 | Thomas |
| 2014/0290025 A1 | 10/2014 | Custer |
| 2015/0014108 A1 | 1/2015 | Vecellio |
| 2015/0101958 A1 | 4/2015 | Cross |
| 2016/0187046 A1 | 6/2016 | Chen et al. |
| 2016/0205913 A1 | 7/2016 | Aston et al. |
| 2016/0244239 A1 | 8/2016 | Nash |
| 2016/0374440 A1 | 12/2016 | Lundy et al. |
| 2017/0073146 A1 | 3/2017 | Kuhn et al. |
| 2017/0343247 A1 | 11/2017 | Ahmad et al. |
| 2018/0206650 A1 | 7/2018 | Kong et al. |
| 2018/0220759 A1 | 8/2018 | Johnson |
| 2018/0252458 A1 | 9/2018 | Furneaux et al. |
| 2018/0263346 A1 | 9/2018 | Stephens |
| 2018/0343995 A1 | 12/2018 | Dingler et al. |
| 2019/0216193 A1 | 7/2019 | Kabalin |
| 2019/0234684 A1 | 8/2019 | Kabalin |
| 2020/0077760 A1 | 3/2020 | Grill et al. |
| 2020/0228056 A1 | 7/2020 | Miller |
| 2021/0007451 A1 | 1/2021 | Tan |
| 2021/0007452 A1 | 1/2021 | Tan |
| 2021/0009313 A1 | 1/2021 | Tan |

(56) References Cited

U.S. PATENT DOCUMENTS

| | | |
|---|---|---|
| 2021/0068510 A1 | 3/2021 | Johnson |
| 2021/0212442 A1 | 7/2021 | Webb |
| 2021/0262724 A1 | 8/2021 | Chen |
| 2021/0368955 A1 | 12/2021 | Fernandes |
| 2023/0027563 A1 | 1/2023 | Fadal et al. |
| 2023/0232952 A1 | 7/2023 | Zucco |

FOREIGN PATENT DOCUMENTS

| | | |
|---|---|---|
| CN | 201360487 Y | 12/2009 |
| CN | 101786524 A | 7/2010 |
| CN | 102972367 A | 3/2013 |
| CN | 104925344 A | 9/2015 |
| CN | 205357836 U | 7/2016 |
| CN | 206502215 U | 9/2017 |
| EP | 0071274 A2 | 2/1983 |
| GB | 6119047 | 2/2021 |
| JP | H07241210 A | 9/1995 |
| JP | D1128650 | 12/2001 |
| JP | 2002240868 A | 8/2002 |
| JP | D1173649 | 5/2003 |
| WO | 2019227267 A1 | 12/2019 |

OTHER PUBLICATIONS

5007 Flambeau Pro-Angler Sling Pack (Kinetic Blue), unknown first available date, evolutionoutdoor.com [online], [site visited Nov. 24, 2020], Available from internet U RL:https://evolutionoutdoor.com/products/5007-flambeau-pro-angler-sling-pack-kinetic-blue?variant=35241408331932 (Year: 2020.

Academy, "H2O Xpress Pro Tackle Bag II," on sale at least as of Apr. 1, 2022 (https://www.academy.com/p/h20-xpress-pro-tackle-bag-ii?sku=blue ) (Year: 2022).

Amazon, "Evolution Outdoor Design Large Mouth Double Decker Mossy Oak Tackle Backpack 3600 Manta Grey Camo Evolution", Date first listed on Amazon Sep. 14, 2017. (https://www.amazon.com/Evolution-Outdoor-Design-Backpack-Fishing/dp/B07PJWZXHY) (Year: 2017).

Amazon, "Flambeau 4007 Heritage Tackle Bag, Fir Green/Pewter/Rust, FL40001", First on sale Apr. 23, 2020. (https://www.amazon.com/Fiambeau-Heritage-Bait-Binder/dp/B089469PPT) (Year: 2020).

Amazon, "Piscifun Fishing Tackle Backpack with 4 Trays Large Waterproof Tackle Bag Storage . . . ", (https://www.amazon.com/Piscifun-Backpack-Capacity-Waterproof-Protective/dp/B07CGJ DTN GI} (Year: 2018), 13 pgs.

Amazon, "Westfield Fishing Tackle Bag Water Resistant Soft Sided Waist Shoulder Carry Storage Hiking Climbing Fly," on sale at least as of Apr. 1, 2022 (https://www.amazon.co.uk/Westfield-Fishing-Resistant-Shoulder-Climbing/dp/B01H6WE47Y) (Year: 2022).

Bass Pro Shops, "Bass Pro Shops Advanced Anglers II Large Tackle System," on sale at least as of 204-01-2022, (https://www.basspro.com/shop/en/bass-pro-shops-advanced-anglers-ii-large-tackle-system) (Year: 2022).

Bass Pro Shops, "Cabela's Extreme Wide-Top Tackle Bag," on sale at least as of Apr. 1, 2022 (https://www.basspro.com/shop/en/cabelas-extreme-wide-top-3600-tackle-bag) (Year: 2022).

Bass Pro Shops, "Plano B-Series 3600 Tackle Bag," on sale at least as of Apr. 1, 2022 (https://www.basspro.com/shop/en/plano-b-series-3600-tackle-bag) (Year: 2022).

Evolution Outdoor Drift Series Topless Horizontal Tackle Bag, first available Feb. 24, 2021, amazon.com [online], [site visited Jun. 28, 2021], Available at internet URL: https://www.amazon.com/Evolution-Outdoor-Topless-Horizontal-Tackle/dp/B08WRNXBXV?th=1&psc=1 (Year: 2021).

Evolution Outdoor Drift Series Topless Vertical Tackle Bag, first available Mar. 2, 2021, amazon.com [online], [site visited Jun. 28, 2021], Available at internet URL: https://www.amazon.com/Evolution-Outdoor-Topless-Vertical-Tackle/dp/B08WRVCF31?th=1 (Year: 2021).

Flambeau 5007 Pro-Angler Tackle Bag (Grey/Red), first available Apr. 23, 2020, amazon.com [online], [site visited Nov. 24, 2020], w Available from internet U RL: https://www.arnazon.corn/Fiarnbeau-5007 -Pro-Angler-Tackle-Grey/dp/B089458PL7 /ref=sr _1_22?dchild=1&gclid=EAiaiQobCh M 10uut0b6b 7QIVCDiGC% E2%80% A6 (Year: 2020).

Flambeau Heritage 4007 Tackle Bag, unknown first available date, DicksSportingGoods.com [online], [site visited Nov. 24, 2020], Available from internet U RL: https://www.dickssportinggoods.com/p/flambeau-heritage-4007-tackle-bag-20fmbaflmbhrtg3 70tbx/20fmbaflmbhrtg370tbx?sku=21521402&camp=CSE:%E2%80% A6 (Year: 2020).

International Search Report and Written Opinion dated May 19, 2017 of PCT Application No. PCT/US2016/047971, 14 pages.

KastKing Fishing Tackle Bag, first available Jun. 27, 2018, amazon.com [online], [site visited Jun. 28, 2021], Available at internet URL: https://www.amazon.com/KastKing-Saltwater-Waterproof-Medium-Hoss-15x11x10-25/dp/B07XRFSFPN/ref=pd_lpo_3?pd_rd_i=B07F2GH9VS&psc=1 (Year: 2018).

KastKing Fishing Tackle Bags, first available Jun. 27, 2018, amazon.com [online], [site visited Nov. 14, 2018], Available from internet U R L: https : 1/www .amazon. com/d p/BO7F2HV28F/ref=sspa_dk_ detail_6?pd_rd_i=BO7XRFSFPN&pd_rd_w=a6HTH&pf_rd_p7d37a48b-2b1a-4373-8c1a-bd%E2%80%A6 (Year: 2018).

Okuma Fishing Tackle Soft Sided Tackle Bag, first available Oct. 23, 2015, amazon.com [online], [site visited Nov. 24, 2020], Available from internet U RL: https://www.arnazon.com/Okurna-Fishing-Tackle-Soft-Sided/dp/B018M56S28 (Year: 2015).

Plano A-Series 2.0 Quick Top, unknown first available date, planomolding.com [online], [site visited Jan. 9, 2023], Available at URL: https://planomolding.com/products/aseries-20-quick-top-plaba700?variant=4046805427 8304 (Year: 2023).

Plano Guide Series 3600 Tackle Bag, unknown first available date, tacklecove.com [online], [site visited Jan. 9, 2023], Available at URL:https://www.tacklecove.com/store/p/496-Plano-Guide-Series-3600-Tackle-Bag.aspx (Year: 2023).

Plano Guide Series Tackle Bag, first available Feb. 10, 2020, amazon.com [online], [site visited Jun. 28, 2021], Available at internet URL: https://www.amazon.com/Piano-Premium-Storage-included-PLABG371/dp/B084NQLFMH/ref=pd_Ipo_2?pd_rd_i=B084NQLFMH&psc=1 (Year: 2020).

Reebow Gear Tactical Sling Bag . . . , first available Jan. 7, 2018, amazon.com [online], [site visited Nov. 24, 2020], Available frominternet U RL: https://www.amazon .com/Tacticai-Siing-Military-Shoulder-Backpack/dp/B0768G7H9N?th= 1 (Year: 2018).

Walmart—Ozark Trail Outdoor Equipment "Mesh Bottom Tackle Bag"—As early as 2019.

Walmart, "Ozark Trail 370 Large Pro Quick Access Soft Sided Fishing Tackle Bag", on sale at least as of Apr. 1, 2022. (https://www.walmart.com/ip/Ozark-Trail-370-Large-Pro-Quick-Access-Soft-Sided-Fishing-Tackle-Bag-Black/474776073 ) (Year: 2022).

* cited by examiner

WELDED THERMOPLASTIC HYBRID COOLER AND METHOD OF MANUFACTURING SAME

CROSS-REFERENCE TO RELATED APPLICATIONS

This application is a continuation of U.S. application Ser. No. 17/059,526, filed Nov. 30, 2020, now U.S. Pat. No. 11,673,344, which is the national stage (Rule 371) of international application No. PCT/CN2018/088627 filed May 28, 2018, the technical disclosures of which are hereby incorporated herein by reference.

TECHNICAL FIELD

The present disclosure relates to insulated coolers. More particularly, and not by way of limitation, the present disclosure is directed to welded thermoplastic hybrid coolers and related methods of manufacturing welded thermoplastic hybrid coolers.

BACKGROUND

Insulated coolers are commonly used to keep food and drinks cool on picnics, camping trips, beach trips, and other excursions where conventional refrigeration is not a feasible option. These receptacles are fabricated from thermally insulating materials that resist a transfer of heat, thereby insulating their contents from such heat so as to keep the contents cool over an extended period of time. The structure of a cooler is typically an insulated shell used to form a hollow cavity or storage section within to store items to be kept cool. Items to be kept cool are placed along with a cold source, typically ice or cold packs, within the storage section.

Coolers are generally portable and include handles for lifting, and some coolers include integrated wheels to facilitate transport. Traditional coolers were box-shaped and had a galvanized exterior. Over time, coolers came to have hard plastic exteriors, and are sometimes known as "hard-body" coolers. But hard-body coolers are often inconvenient because their fixed shape can make them difficult to stow or transport. Further, such hard-body coolers can be difficult for an individual to carry. As a result, insulated coolers replacing the hard, rigid exteriors with soft, flexible fabrics or plastics, sometimes known as "soft-body" coolers, became a popular alternative.

Soft-body insulated coolers tend to be lighter in weight and less bulky, making them generally easier to transport. However, while soft-body coolers can be easier to stow or transport, they often fail to provide the same performance as a hard-body cooler. In particular, soft-body coolers are far less sturdy than hard-body coolers due to their soft, pliable, and flexible outer shell. Thus, repeated use of conventional soft-body coolers can quickly lead to portions of the cooler, for example, the top and bottom edges and corners, wearing and/or tearing from repeated contact with abrasive surfaces, or even persons or objects rubbing against these areas, to the point of reducing the useful life of the cooler.

Furthermore, soft-body coolers typically have zipper mechanisms for closing their lids to the cooler bodies. However, conventional zippers used on soft-body coolers are generally inadequate in that they tend to pull away or tear out easily from the portions of the soft-body cooler to which they are attached. Moreover, these conventional zipper mechanisms are typically fabric zippers where their fabrics do not provide any insulating properties, and thus their use decreases the conventional soft-body cooler's insulating capabilities.

Accordingly, there is a need for improved soft-body coolers to address the above-mentioned deficiencies found in conventional soft-body coolers. Embodiments of the present disclosure are directed to these and other improvements.

SUMMARY

The disclosed principles provide for inventive insulated hybrid coolers, and related methods for manufacturing such hybrid coolers, that overcome the deficiencies associated with conventional coolers.

In one aspect, the disclosed principles are directed to insulated hybrid coolers constructed of both soft and rigid materials. In one embodiment, an exemplary hybrid cooler may comprise a cooler body, which includes a front wall and a back wall, and opposing body side walls connecting the body front wall to the body back wall, where the body front, back and side walls each comprise soft thermoplastic. The body can also include a base portion comprising rigid plastic connected to bottom edges of the body front, back and side walls via a first thermoplastic sealing strip that is bonded or welded, such as through high frequency (H/F) heat welding, to the bottom edges of the body front, back and side walls, and sewn to top edges of the base portion.

An exemplary hybrid cooler may also comprise a lid at least partially connected to the body, where the lid includes a front wall and a back wall, and opposing lid side walls connecting the lid front wall to the lid back wall, where the lid front, back and side walls each comprise soft thermoplastic. The lid may also include a top portion comprising rigid plastic connected to top edges of the lid front, back and side walls via a second thermoplastic sealing strip H/F heat welded to the top edges of the lid front, back and side walls, and sewn to bottom edges of the top portion. Such hybrid coolers as disclosed herein may also include a waterproof liner disposed along inner surfaces of the body and the lid, and insulation disposed between the liner and the body and lid. Such coolers may also include a zipper for closing the lid to the body, where a first side of the zipper is connected to the bottom edges of the lid front and side walls, and at least a portion of the lid back wall, and where a second side of the zipper is connected to top edges of the body front and side walls, and at least a portion of the body back wall.

In another aspect, the disclosed principles are directed to methods of manufacturing an insulated hybrid cooler. In one embodiment, the method may comprise providing a body portion comprising a front wall and a back wall, and opposing body side walls connecting the body front wall to the body back wall, where the body front, back and side walls each comprise soft thermoplastic. The method may also comprise forming a base portion comprising rigid plastic for connecting to the body portion. To connect the two, the method may include connecting top edges of the base portion to bottom edges of the body front, back and side walls using a first sealing strip, that may be made of a rubber or rubber-type material. This may be done by H/F heat welding one edge of the first sealing strip to the bottom edges of the body front, back and side walls, and sewing a second edge of the first sealing strip to the top edges of the base portion.

In addition, such an exemplary method may include providing a lid at least partially connected to the body, where the lid comprises a front wall and a back wall, and opposing lid side walls connecting the lid front wall to the lid back wall. As with the body area, the lid front, back and side walls can also each comprise soft thermoplastic. The method may also include forming a top portion comprising rigid plastic for connecting to the body portion. To connect these components, the method may include connecting bottom edges of the top portion to top edges of the lid front, back and side walls using a second sealing strip by H/F heat welding one edge of the second sealing strip to the top edges of the lid front, back and side walls, and sewing a second edge of the second sealing strip to the bottom edges of the top portion.

Furthermore, a disclosed exemplary method may also include disposing a waterproof liner along inner surfaces of the body and the lid, and disposing insulation between the liner and the body and lid. Finally, an exemplary method may also provide a means for closing the lid to the body using a zipper, wherein a first side of the zipper is connected to bottom edges of the lid front and side walls, and at least a portion of the lid back wall, and wherein a second side of the zipper is connected to top edges of the body front and side walls, and at least a portion of the body back wall. In some embodiments, the sides of the zipper are also connected by H/F heat welding.

Other exemplary embodiments of coolers and related methods for manufacturing coolers in accordance with the disclosed principles, and the advantages associated with each, are also discussed herein.

BRIEF DESCRIPTION OF THE DRAWINGS

The novel features believed characteristic of the disclosure are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

The various embodiments of the presently disclosed subject matter are described with specificity to meet statutory requirements. However, the description itself is not intended to limit the scope of this patent. Rather, it has been contemplated that the claimed subject matter might also be embodied in other ways, to include different steps or elements similar to the ones described in this document, in conjunction with other present or future technologies. The components described hereinafter as making up various elements of the invention are intended to be illustrative and not restrictive. Many suitable components that would perform the same or similar functions as the components described herein are intended to be embraced within the scope of the invention. Such other components not described herein can include, but are not limited to, for example, similar components that are developed after development of the presently disclosed subject matter.

It should also be noted that, as used in the specification and the appended claims, the singular forms "a," "an" and "the" include plural references unless the context clearly dictates otherwise. References to a composition containing "a" constituent is intended to include other constituents in addition to the one named. Also, in describing the preferred embodiments, terminology will be resorted to for the sake of clarity. It is intended that each term contemplates its broadest meaning as understood by those skilled in the art and includes all technical equivalents, which operate in a similar manner to accomplish a similar purpose.

Also, the use of terms herein such as "having," "has," "including," or "includes" are open-ended and are intended to have the same meaning as terms such as "comprising" or "comprises" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

Figure 1:
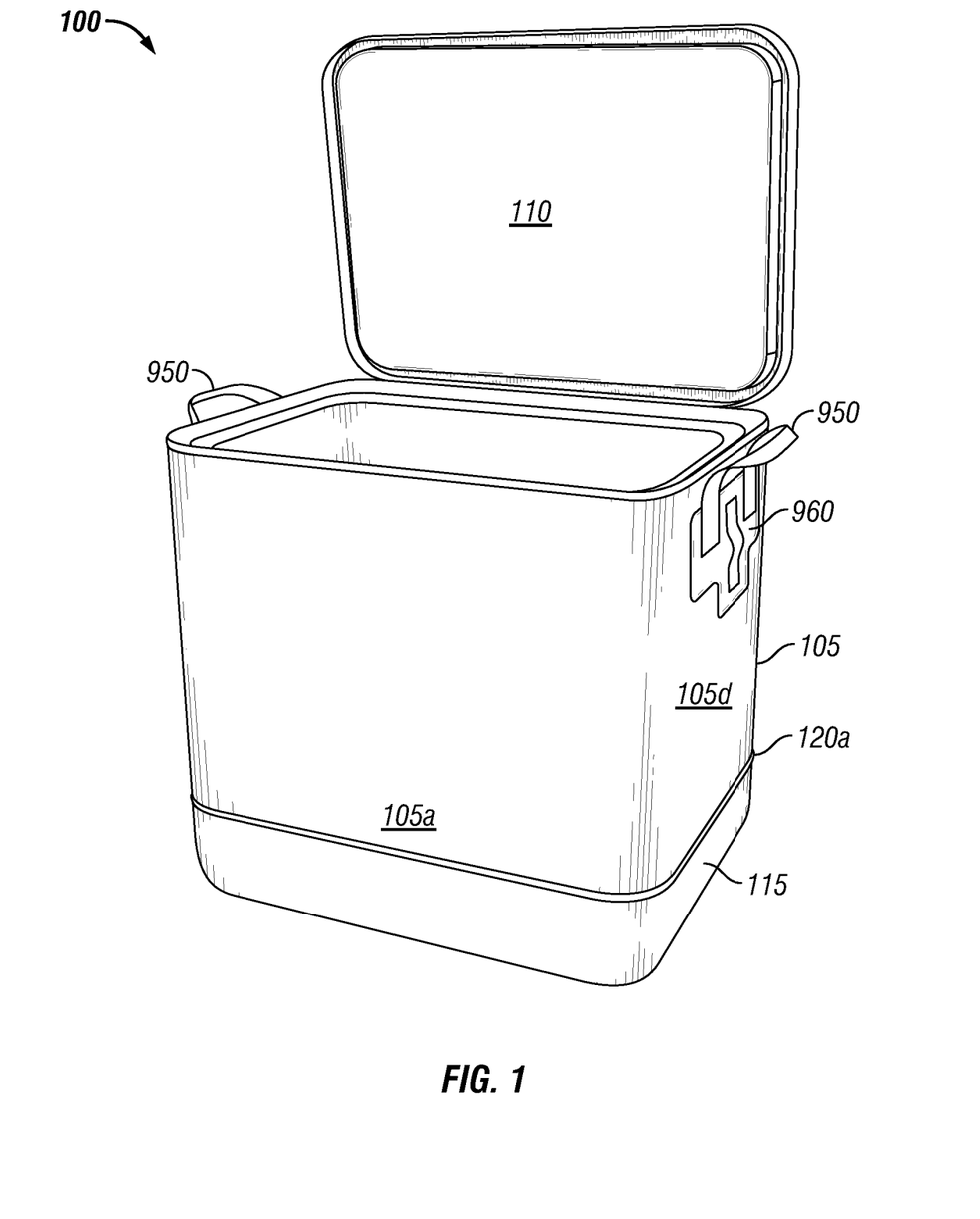
FIG. 1 illustrates a perspective view of an insulated cooler manufactured in accordance with the disclosed principles.

Looking initially at FIG. 1, illustrated is a perspective view of an insulated cooler 100 manufactured in accordance with the disclosed principles. The cooler 100 is comprised of a body 105 and a lid 110, where the lid 110 is connected to the body 105 at one side via a hinge. In other embodiments, the lid 110 may not be connected to the body 105 at all and is instead simply placed on top of the body 105 when closing the cooler 100. In yet other embodiments, the lid 110 is connected to the body 105 by a removable connection, such as a disconnecting hinge comprising snaps or a zipper.

The body 105 of the cooler 100 includes a front wall 105*a* and a back wall 105*b* (not illustrated), and opposing side walls 105*c* and 105*d* (not illustrated) connecting the front wall 105*a* to the body back wall 105*b*. Additionally, the front wall 105*a*, back wall 105*b*, and side walls 105*c*, 105*d* may each be manufactured from a soft material. For example, these components of the body 105 may be manufactured from soft thermoplastic such as thermoplastic polyurethane; however, other soft materials such a polyolefin or soft fabric, whether plastic-based or not, may also be used. As discussed above, the advantages of such soft materials to construct a soft-shell cooler are numerous, and those advantages are retained by a cooler constructed in accordance with the disclosed principles.

The body 105 of the cooler 100 also includes a base portion 115 located at and connected to the bottom edges of the body's front wall 105a, back wall 105b, and side walls 105c, 105d. The base 115 is connected to the body 105 using a first sealing strip 120a. The unique technique for connecting the base 115 to the body 105 using the first sealing strip 120a in accordance with the disclosed principles is discussed in detail below. In an exemplary embodiment, the base 115 is formed from a rigid plastic material, such as acrylonitrile butadiene styrene (ABS), and may advantageously be thermoformed in a singular piece. As used herein, the term "rigid" means the stiffness, hardness or resiliency of a material sufficient to maintain its shape even in response to forces causing its distortion. Also, the term "soft" as used herein means the lack of stiffness or rigidity of a material is such that it is yielding readily to touch or pressure and its shape may be distorted in response to forces applied to it.

Figure 2:
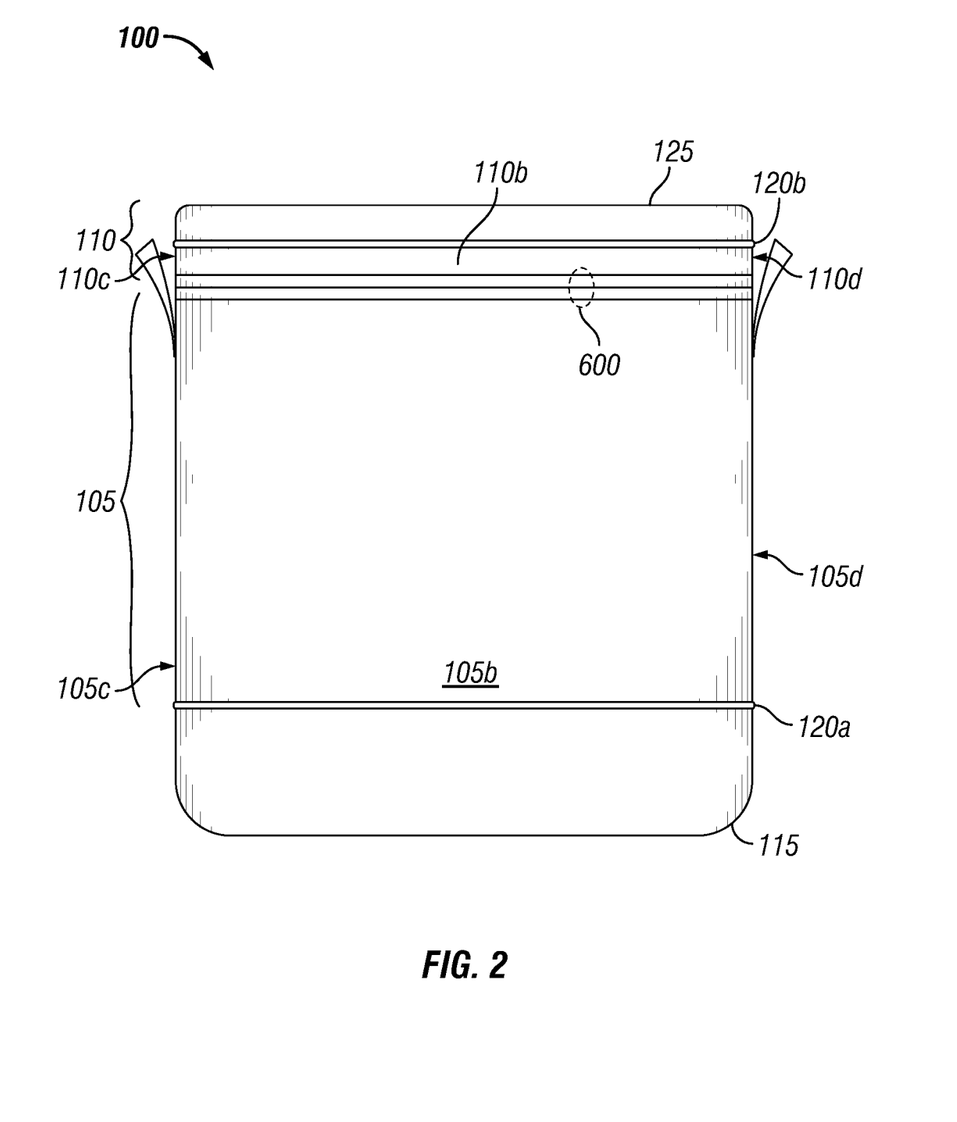
FIG. 2 illustrates a front plan view of the insulated cooler of FIG. 1.

Turning now to FIG. 2, with continued reference to FIG. 1, illustrated is a front plan view of the insulated cooler 100 of FIG. 1. From this front view, the body 105 and lid 110 of the cooler 100 can be seen, as well as the base portion 115 attached to the bottom of the body 105. The lid 110 of the cooler 100 also includes its own front wall 110a (see FIG. 1) and back wall 110b, and opposing side walls 110c, 110d connecting the front wall 110a to the body back wall 110b. Additionally, as with the body 105, the front wall 110a, back wall 110b, and side walls 110c, 110d may each also be manufactured from a soft material, such as a soft thermoplastic like thermoplastic polyurethane or other soft materials, such as a polyolefin or a soft fabric whether plastic-based or not. With respect to both the body 105 and lid 110, a thermoplastic, or thermosoftening plastic, is a plastic material, a polymer that becomes pliable or moldable above a specific temperature and solidifies upon cooling. Exemplary thermoplastic materials that may be employed in either or both the body 105 or lid 110 include, but are not limited to, thermoplastic polyurethane (TPU) or thermoplastic polyolefin (TPO) and other thermoplastics such as polypropylene, polyethylene, and polybutylene. Other materials that may be employed could also include polyvinyl chloride (PVC), chlorosulfonated polyethylene (CSPE or CSM), chlorinated polyethylene (CPE), and ethylene propylene diene terpolymer (EPDM).

The lid 110 of the cooler 100 also includes a top portion 125 located at and connected to top edges of the lid's front wall 110a, back wall 110b, and side walls 110c, 110d. The top 125 is connected to these portions of the lid 110 using a second sealing strip 120b. The unique technique for connecting the top 125 to the lid 110 using the second sealing strip 120b in accordance with the disclosed principles is also discussed in detail below. In an exemplary embodiment, the top 125, like the base 115, is also formed from a rigid plastic material, such as ABS, and may also advantageously be thermoformed in a singular piece. In some embodiments, both the base 115 and the top 125 are manufactured in the same manner and from the same rigid material. Moreover, in specific embodiments, the rigid top 125 of the lid 110 may also have desired shapes formed therein, such as circular depression that can function as cup holder, as well as a rectilinear depression that operates as a tray to assist in holding items from sliding off of the upper surface of the top 125.

An insulated cooler 100 constructed as disclosed herein offers the advantages associated with soft materials used in the body 105 of the cooler 100, while simultaneously including rigid materials on the top 125 and base 115 of the cooler 100 in order to also provide some of the distinct advantages of hard-shell coolers. For example, the soft body 105 of a disclosed cooler 100 offers the lighter weight and ease of mobility of conventional soft-shell coolers, while the rigid top 125 and rigid base 115 provide the durability of conventional hard-shell coolers. For example, the rigid top 125 and base 115 of the disclosed cooler 100 provides the sturdiness on the upper and lower corners and edges of the cooler 100 typically found on hard-shell coolers. Moreover, the rigid top 125 of the disclosed cooler 100 can further function of as a table-like platform for users to place items upon with a reduced risk of those items falling or sliding off.

In order to provide the combination of a soft body 105 and rigid base 115 and top 125, the disclosed principles provide a technique for connecting the rigid and soft materials together. In one embodiment, the rigid and soft materials can be connected using a thermoplastic material for each of the base 115 and the top 125. A thermoplastic, or thermosoftening plastic, is a material that becomes pliable or moldable above a specific temperature and solidifies upon cooling, and thus may be welded together, for example, through heat welding, H/F heat welding, ultrasonic welding, or any other bonding technique. The material comprising the sealing strips may be a rubber or elastomer, such as TPU, and thus will have the thermoplastic characteristics of being heat welded, as well as having the capability of being sewn to another material. For example, the selected TPU material may be selected such that is has a welding temperature in the range of about 80° C. to 120° C., but of course other temperatures may be employed depending on the specific thermoplastic materials employed or developed. Also, in some embodiments, the composition of the material is deemed safe under California Proposition 65, or other similar protective legislation. In addition, in advantageous embodiments, the sealing strips may include waterproofing characteristics, such as the flexibility of rubber or elastomer materials to create a seal. In such embodiments, although the sealing strips are at least partially sewn, and thus pierced, the elastic characteristics of the material (i.e., the softness and flexibility) comprising the disclosed sealing strips will still substantially seal around the piercings and thread material caused by being sewn to another material. Looking again to FIG. 2, a first sealing strip 120a is shown connecting and providing a seal between the rigid base 115 and the soft material at the lower edges of the body 105. In addition, a second sealing strip 120b is shown connecting and providing a seal between the rigid top 125 and the soft material at the upper edges of the lid 110.

Figure 3:
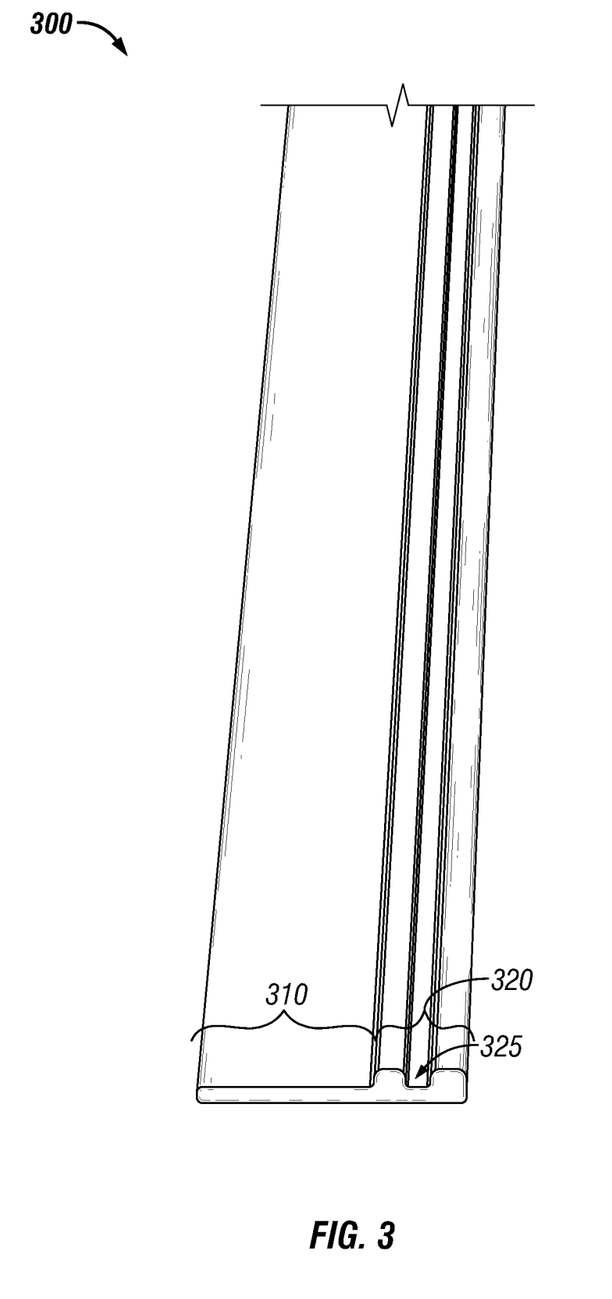
FIG. 3 illustrates a close-up view of one embodiment of a thermoplastic sealing strip for use in manufacturing a cooler in accordance with the disclosed principles.

FIG. 3 illustrates a close-up view of one embodiment of a thermoplastic sealing strip 300 for use in manufacturing a cooler in accordance with the disclosed principles. In one specific embodiment, the sealing strip 300 is formed as a unitary piece and comprises a rubber, rubberized, or elastomer thermoplastic material that provides the characteristics discussed above. The sealing strip 300 is divided longitudinally such that one longitudinal side comprises a welding side 310 and the opposing longitudinal side comprises a sewing side 320. More specifically, the welding side 310 of the sealing strip 300 may be provided as a flat uniform surface, and may comprise one-half or more of the width of the sealing strip 300. The surface area provided by the welding side 310 is configured to be bonded, preferably by H/F heat welding, to both the soft material comprising the body 105 or the lid 110 depending on whether the sealing strip 300 is being connected to the rigid base 115 or rigid top 125, respectively.

To H/F heat weld a sealing strip 300 to either the soft thermoplastic material of either the body 105 or lid 110 of the cooler 100, respectively, the H/F heat welding employs a heat induction technique such that thermoplastic polymer material of either the body 105 or the lid 110 respectively fuses with the thermoplastic polymer material of the welding side 310 of each strip 300. In general, heat welding (sometimes referred to as heat fusion) is a welding process used to join two different pieces of a thermoplastic material. Such a process involves heating both pieces simultaneously and pressing them together. The two pieces then cool together and form a permanent bond. Also, heat welding may be a H/F heat welding technique, or other advantageous bonding technique. For example, an iron or mandrel, which may also include a high frequency electronic element, may be pressed and moved along the overlapped welding side 310 of a strip 300 and one of the edges of the body 105 or lid 110. As the iron is moved along the overlapped areas, the mating surfaces of the overlapping thermoplastic materials are heated and then pressed together to complete the welded seal between the two. Of course, other techniques for heat welding or otherwise bonding the overlap sections of materials may also be employed. When done properly, the two pieces become inseparable from each other.

Thermoplastics that are too dissimilar can result in improper bonding, and thus in exemplary embodiments the thermoplastic materials for the sealing strips 300 and the soft thermoplastic materials of both the body 105 and the lid 110 should be selected so as to be similar in composition to ensure proper bonding through H/F heat welding.

Figure 4:
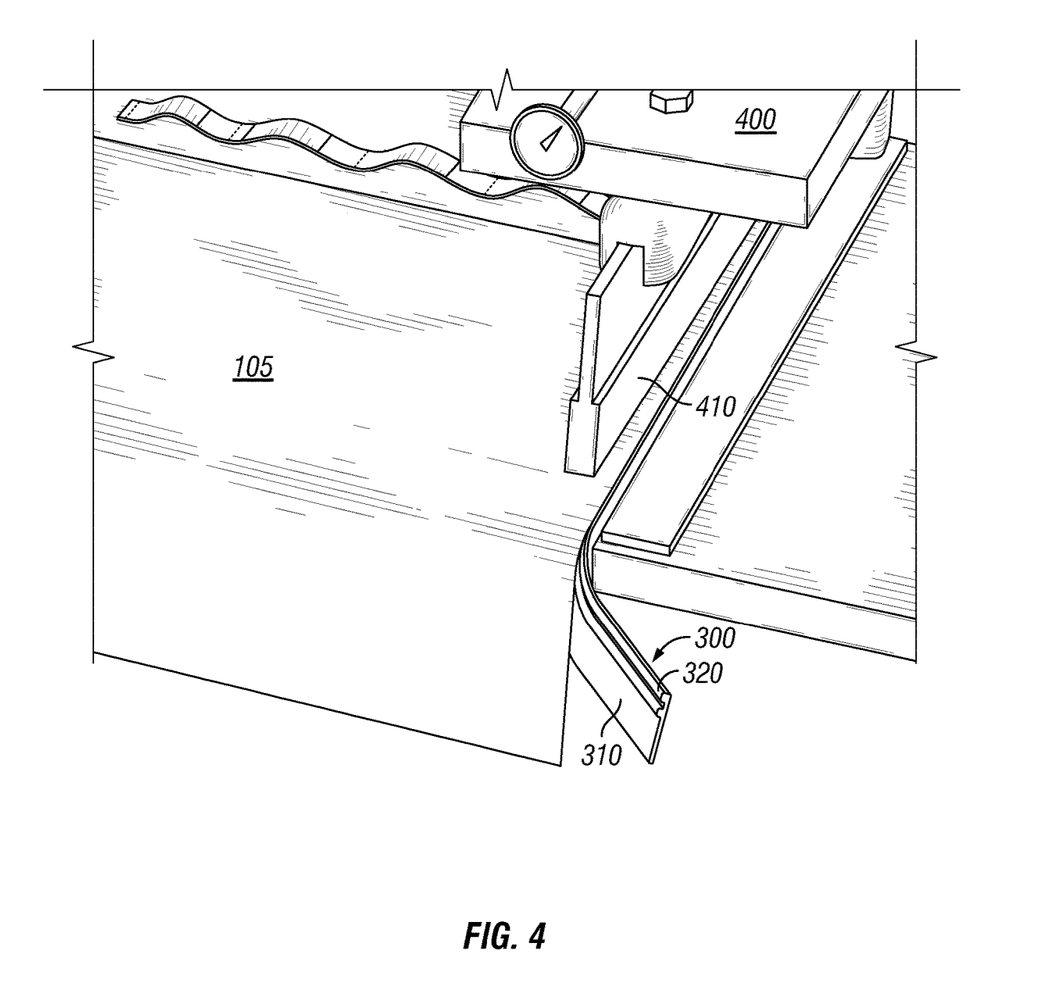
FIG. 4 illustrates an image of the process of H/F heat welding of a sealing strip to the soft material of the body of a cooler constructed in accordance with the disclosed principles.

Turning briefly to FIG. 4, illustrated is an image of the H/F heat welding of a sealing strip 300 to the soft material of the body 105 of a cooler 100 constructed as disclosed herein. The welding apparatus 400 includes an iron 410 sized to correspond with the welding side 310 of the sealing strip 300. The iron 410 is heated to a temperature sufficient to heat weld the soft material of the body 105 with the rubber material of the sealing strip 300. The specific temperatures and/or frequencies employed for each of the materials to be welded are selected based on the density, thickness and composition of each of the materials, and thus one material may be heated for a longer period than the other to facilitate their welding. In other embodiments, the welding apparatus 400 is an ultrasonic welding apparatus, and thus the iron 410 is a welding horn for use in ultrasonically welding the sealing strip 300 to the body 105. In such embodiments, the sonic frequencies for ultrasonic welding of the materials may again be selected based on the characteristics of the materials to be welded. Of course, other techniques for bonding the sealing strip 300 to the soft thermoplastic lid 110 material may also be employed in accordance with the disclosed principles.

Accordingly, with reference to FIGS. 1-4 collectively, a method for manufacturing an insulated hybrid cooler in accordance with the disclosed principles one initially include providing a body 105 of the cooler 100, where the body 105 comprising a front wall 105a, a back wall 105b, and opposing body side walls 105c, 105d connecting the body front wall 105a to the body back wall 105b. Each of the body front, back and side walls 105a-d would each comprise a soft thermoplastic material such as TPU. In addition, an exemplary method would include forming a base 115 of the cooler 100 that is comprised of rigid plastic for connecting to the body portion 105. The process could then connect top edges of the base 115 to bottom edges of the body front, back and side walls 105a-d using a first sealing strip 120a by H/F heat welding one edge of the first sealing strip 120a to the bottom edges of the body front, back and side walls 105a-d, and also sewing a second edge of the first sealing strip 120a to the top edges of the base 115.

Likewise, the exemplary method would include providing a lid 110 at least partially connected to the body 105, where the lid 110 also comprises a front wall 110a, a back wall 110b, and opposing lid side walls 110c, 110d connecting the lid front wall 110a to the lid back wall 110b. Also as before, each of the lid front, back and side walls 110a-d each would comprise soft thermoplastic material as well. The method may thus also include forming a top 125 comprising rigid plastic for connecting to the upper edges of the lid 110. The method may specifically include connecting bottom edges of the top 125 to top edges of the lid front, back and side walls 110 a-d using a second sealing strip by H/F heat welding one edge of the second sealing strip 120b to the top edges of the lid front, back and side walls 110a-d, and also sewing a second edge of the second sealing strip 120b to the bottom edges of the top 125.

By employing H/F heat welding to bond the welding side 310 of each respective sealing strip 300 to the upper edges of the lid and the lower edges of the body 105, not only are each sealing strip 300 permanently attached to the lid 110 and body 105 soft materials, but a waterproof seal between these components is provided. The sewing side 320 of the sealing strip 300 may be provided as a raised channel 325 formed along the longitudinal length of the sealing strip 300, as illustrated in FIG. 3. Specifically, the central, lower portion of the channel 325 is configured to receive the thread placed during the sewing process. By placing the sewn thread between the raised walls of the channel along the sewing side 320, the threads are protected from abrasion or other contact that could threaten the integrity of a portion of the thread, and thus the sewn seam.

Figure 5:
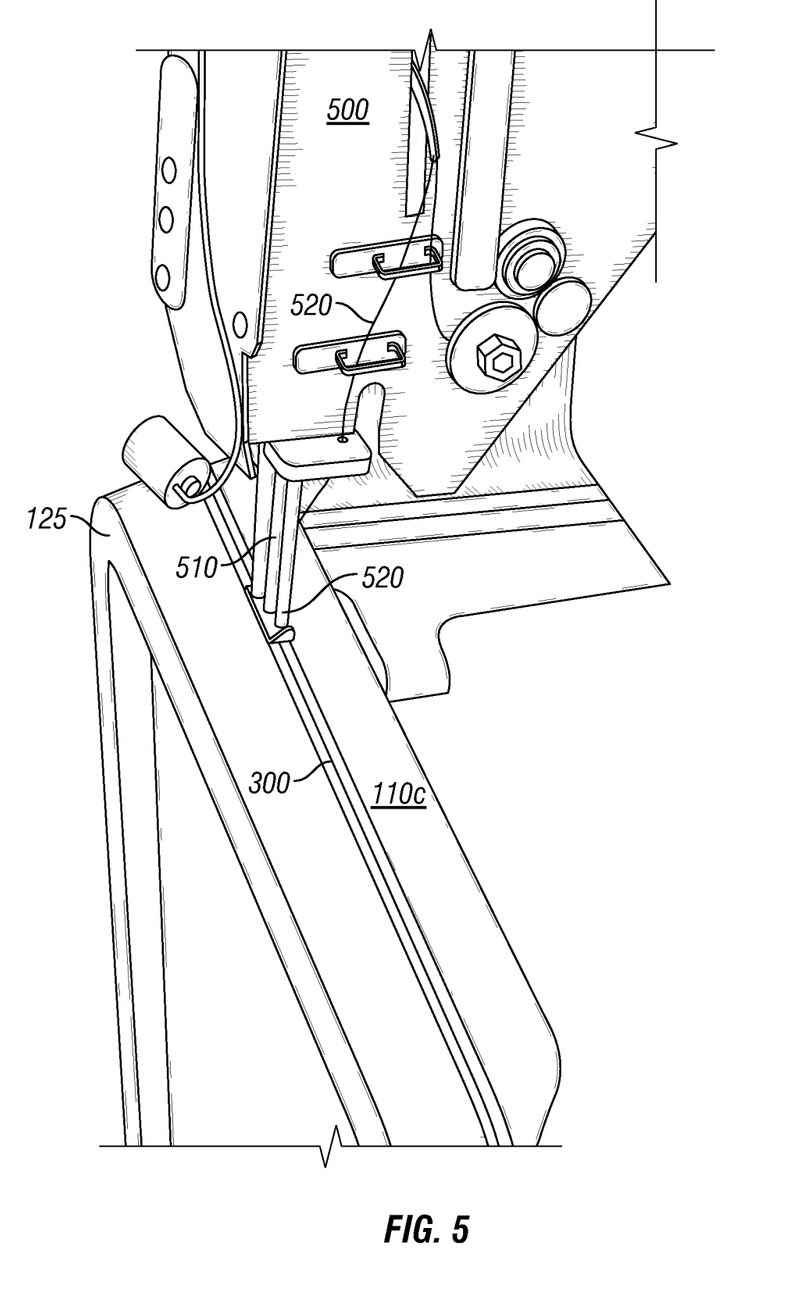
FIG. 5 illustrates an image of the sewing of a sealing strip to a rigid top of a cooler in accordance with the disclosed principles.

During the sewing process, the sewing side 320 of a first sealing strip is affixed to the upper edges of the rigid base 115, and the sewing side 320 of second sealing strip is affixed to the lower edges of the rigid top 125. Specifically, a heavy duty sewing needle is used to sew each sealing strip 300 to the rigid material comprising the base 115 and the top 125. Looking briefly as FIG. 5, illustrated is an image of the sewing of sealing strip 300 to a rigid top 125 in accordance with the disclosed principles. In this image, a sewing machine head 500 having a sewing needle 510 is shown sewing a thread 520 through the channel of the sealing strip 300 and through the lower edge of the rigid top 125. During the sewing, the sewing side 320 of the sealing strip 300 is sewn to the lower edge of the top 125, and is oriented such that the welding side 310 of the sealing strip 300 is extending away from top 125. Also, as illustrated, the welding side 310 may have previously been bonded, such as through H/F heat welding, to the soft thermoplastic material comprising a side wall 110c of the lid 110 of the cooler 100.

It should also be understood that the bonding/welding of the welding side 310 of the sealing strip 300 to the lid 110 material may occur prior to or after the sewing of the strip 300 to the top 125. Moreover, the connection of a sealing strip 300 between the body 105 and the base 115 may also occur in either order, as well as the whether the connection of a sealing strip 300 between the base 115 and body 105 occurs before the connection of a sealing strip 300 between the lid 110 and the top 125. Still further, the welding side 310 of the sealing strip 300 may also be initially bonded to an intermediate thermoplastic material, and then the intermediate material bonded to either the body 105 or the lid 110 in a later heat welding process.

A cooler 100 constructed in accordance with the disclosed principle also may include a zipper closing the lid 110 to the body 105. In one embodiment, a first side of the zipper is connected to bottom edges of the lid 110 front and side walls, and at least a portion of the lid 110 back wall, and a second side of the zipper is connected to top edges of the body 105 front and side walls, and at least a portion of the body back wall 105. With each side of the zipper connected as such, the zipper may then be used to close the lid 110 down onto the body 105 by closing the zipper. In advantageous embodiments, the zipper is a waterproof zipper. Thus, a method of manufacturing a hybrid cooler 100 as disclosed herein may further include installing such a zipper for closing the lid 110 to the body 105, where a first side of the zipper is connected to bottom edges of the lid front and side walls 110a, 110c, 110d, and at least a portion of the lid back wall 110b, and a second side of the zipper is connected to top edges of the body front and side walls 105a, 105c, 105d, and at least a portion of the body back wall 105b.

Figure 6:
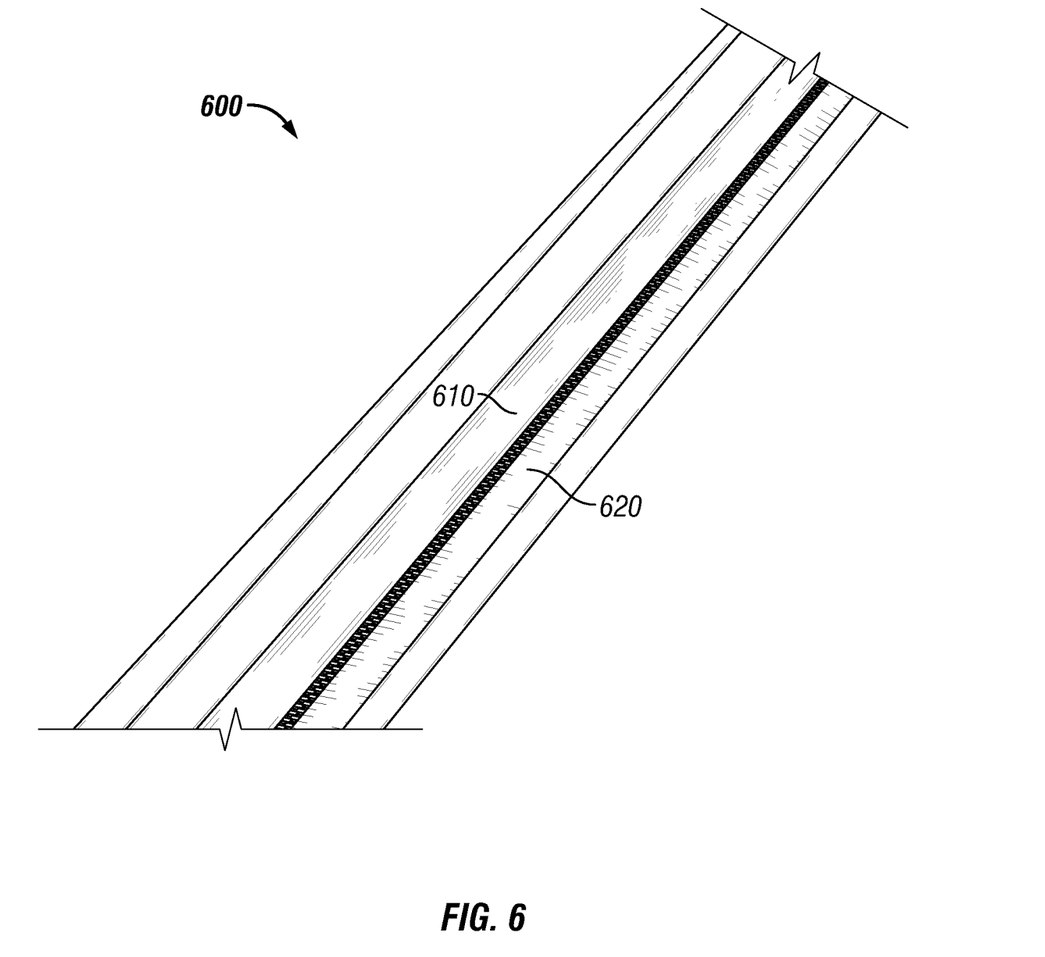
FIG. 6 illustrates an exemplary embodiment of a zipper having waterproof characteristics for use with a cooler constructed in accordance with the disclosed principles.

FIG. 6 illustrates an exemplary embodiment of zipper 600 having waterproof characteristics in accordance with the disclosed principles. More specifically, the zipper 600 includes a soft rubber strips 610, 620 or other elastomer bonded along an outer side of the length of the zipper on each side of its teeth. The material of the strips 610, 620 provides a waterproof seal over the fabric or other material comprising the two lengths of the zipper 600 such that water or other liquid does not pass through this material. In one embodiment, the rubber strips 610, 620 are heat welded on each length of the same side of the zipper 600; however, other techniques for bonding the rubber strips 610,620 on each length of the zipper 600 may also be employed. Additionally, the rubber strips 610, 620 can be positioned so as to lay on the outer surface of the teeth of the zipper 600, such that inner edges of the rubber strips 610, 620 meet and touch one another when the zipper 600 is closed. The touching of the inner edges of the strips 610, 620 assists in providing a waterproof seal to the teeth of zipper 600, for example, to help prevent liquids from passing through the closed teeth of the zipper 600.

Figure 7:
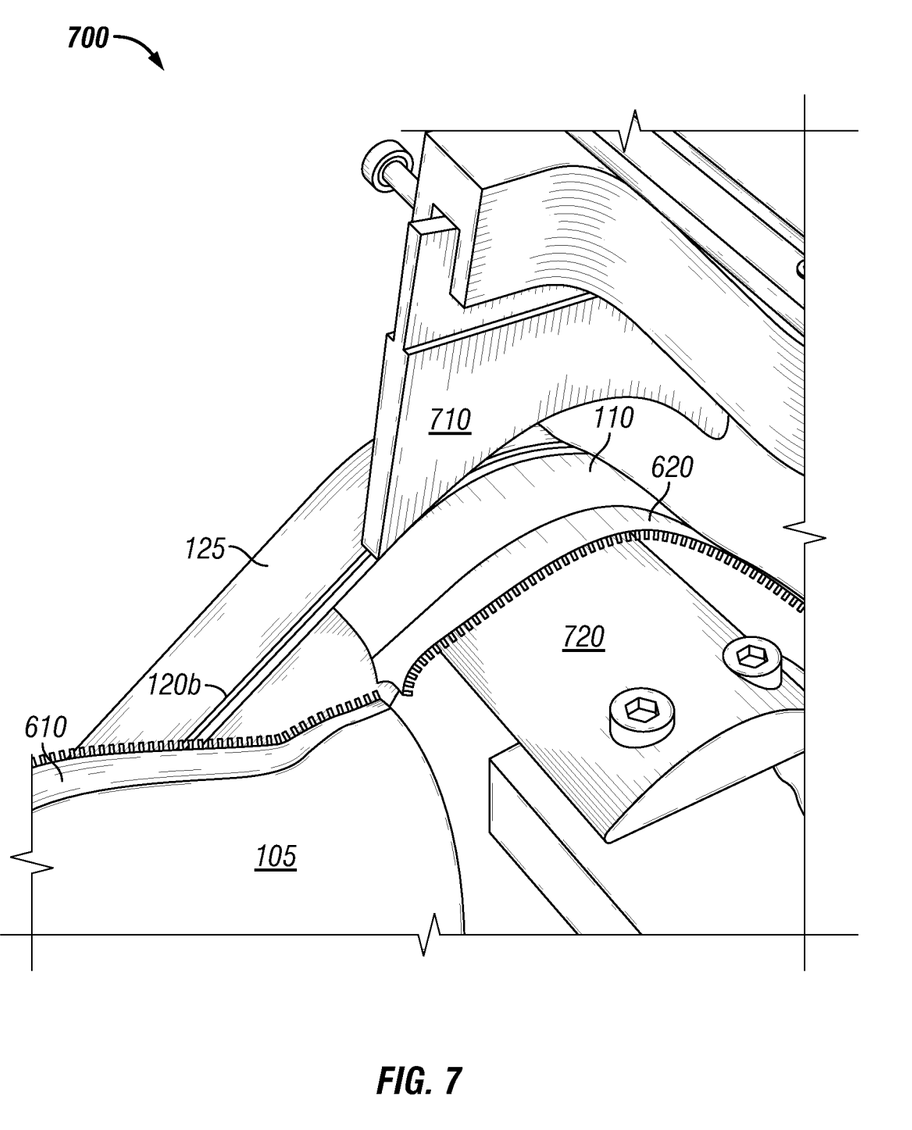
FIG. 7 illustrates an exemplary process for bonding of a rubber strip along one length of the zipper of FIG. 6 to bottom edges of the soft material of the lid of a cooler constructed as disclosed herein.

To install the waterproof zipper 600 on a cooler 100 manufactured in accordance with the disclosed principles, in one embodiment the rubber strip 610 on an outer side of a first length of the zipper is heat welded to the top edges of the body 105 front, back and side walls, and the rubber strip 620 on an outer side of a second length of the zipper is heat welded to the bottom edges of the lid 110 front, back and side walls. FIG. 7 illustrates an exemplary bonding of the rubber strip 620 on one length of the zipper 600 to bottom edges of the soft material of the lid 110. This figure shows a H/F heat welding apparatus 700 used to heat weld the length of the zipper 600 along a corner of the lid 110. An iron 710 having a curved welding surface is used for the corner portion of the welding operation, along with a corresponding curved anvil 720, while for other areas of the lid 110 a straight welding iron (not illustrated) may be employed. The same or similar H/F heat welding technique may also be used to heat weld the rubber strip 610 on other length of the zipper 600 to the soft material of the body 105.

Figure 8:
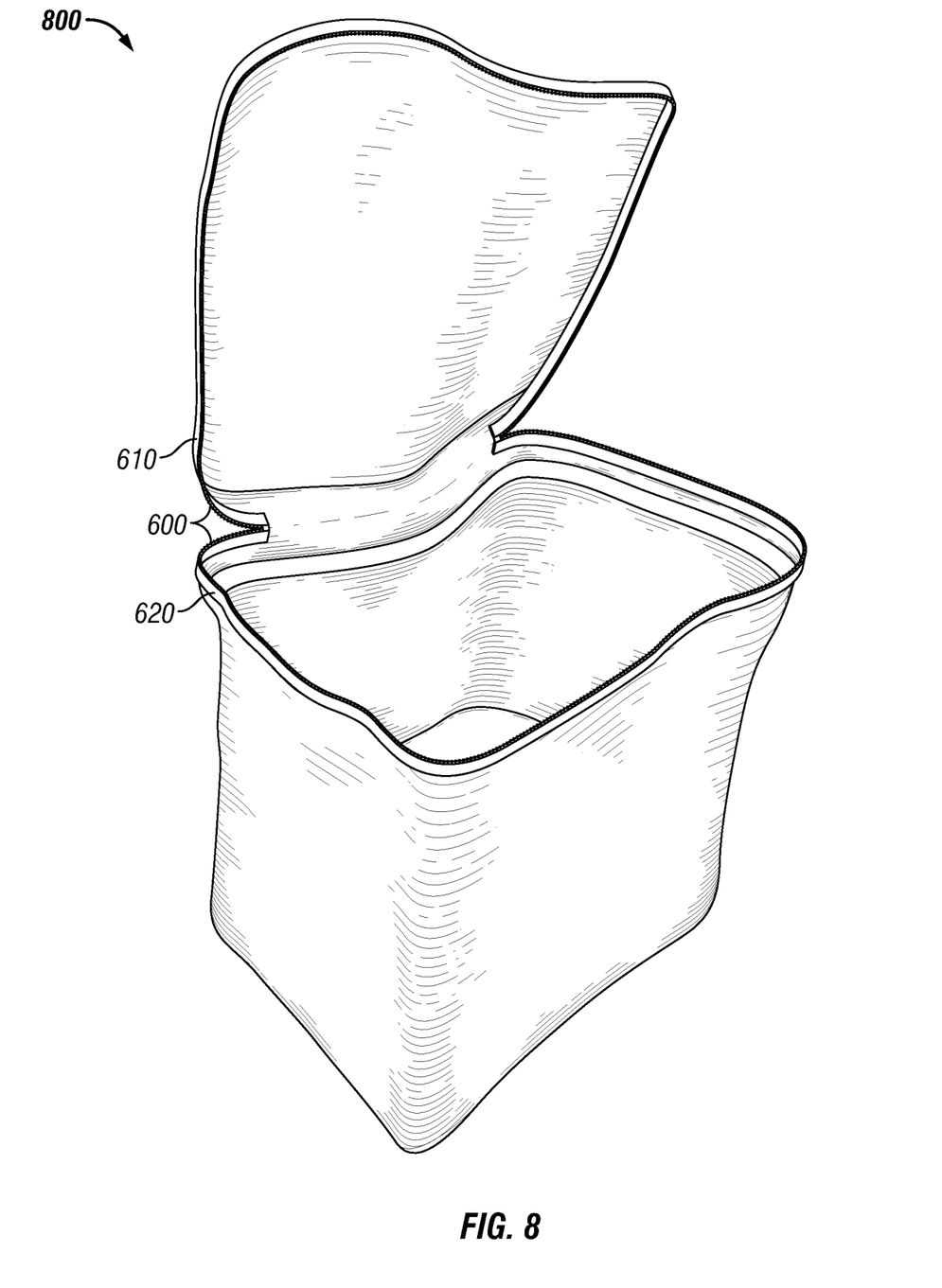
FIG. 8 illustrates one embodiment of a waterproof liner that may be disposed along inner surfaces of the body and lid of a cooler constructed as disclosed herein.

Turning now to FIG. 8, illustrated is one embodiment of a waterproof liner 800 that may be disposed along inner surfaces of the body 105 and the lid 110 of the cooler 100. The liner 800 may be formed from a single piece of material, or may be from of multiple pieces of like material that are permanently joined together, such as through heat welding or a bonding adhesive. The finished waterproof liner 800 may then be placed within the body 105 and lid 110 of the cooler 100, and secured in place by any of a number of techniques. Thus, an exemplary method of manufacturing a hybrid cooler 100 as disclosed herein may further include disposing a waterproof liner along inner surfaces of the body 105 and the lid 110, and well as disposing insulation between a waterproof liner and the body 105 and lid 110. In some embodiments, the composition of the liner 800 material is deemed safe under California Proposition 65, or other similar protective legislation.

To secure the liner 800 within the body 105 and lid 110, the edges of the liner 800 corresponding to the edges of the body 105 and lid 110 where the lengths of the zipper 600 are located may be heat welded or otherwise bonded to those corresponding edges of the body 105 and lid 110. In other embodiments, the rubber strips 610, 620 on each length of the zipper 600 may first be heat welded to the edges of the liner 800, and thereafter heat welded to the corresponding edges of the body 105 and lid 110. In still other embodiments, such as the embodiment illustrated in FIG. 8, the sides along each length of the zipper without the rubber strips 610, 620 may first be joined to the edges of the liner 800, for example, using a permanent adhesive. Thereafter, the rubber strips 610, 620 on the opposed sides of the zipper 600 may be heat welded to the corresponding edges of the body 105 and lid 110. Other surfaces of the liner 800 may also be adhered to the inner surfaces of the front, back and side walls of each of the body 105 and the lid 110 to keep the liner 800 in place within the cooler 100.

Furthermore, insulation can be disposed between the liner 800 and the corresponding portions of the body 105 and lid 110 as the liner 800 is installed in the cooler 100. The insulation may be comprised of closed-cell foam, or any appropriate insulating material. In one embodiment, the insulation is a rigid or semi-rigid material, and thus the relative stiffness of the insulation can provide a defined shape to the soft material used for the front, back and side walls of the body 105 and lid 110. However, in other embodiments, the insulation is soft and flexible thus allowing the body 105 and lid 110 of the cooler 100 to maintain the soft and pliable properties of a soft-shell cooler, aside from the rigid base 115 and top 125.

In yet other embodiments, the cooler 100 further includes a rigid interior support structure disposed between the liner 800 and the body 105 front, back and side walls. Such a rigid support structure can provide a predefined and permanent shape for the body 105 of the cooler 100. For example, the rigid support structure may be comprised of ABS plastic; however, other rigid materials either plastic-based or not may also be employed. Furthermore, the lid 110 may also include such a rigid support structure disposed between the liner of the lid 110 and the lid 110 front, back and side walls. Such a lid support structure may again provide a predefined shape for the lid 110, and this shape may also correspond to and compliment the shape provided by the rigid support structure of the body 105, in exemplary embodiments.

Figure 9:
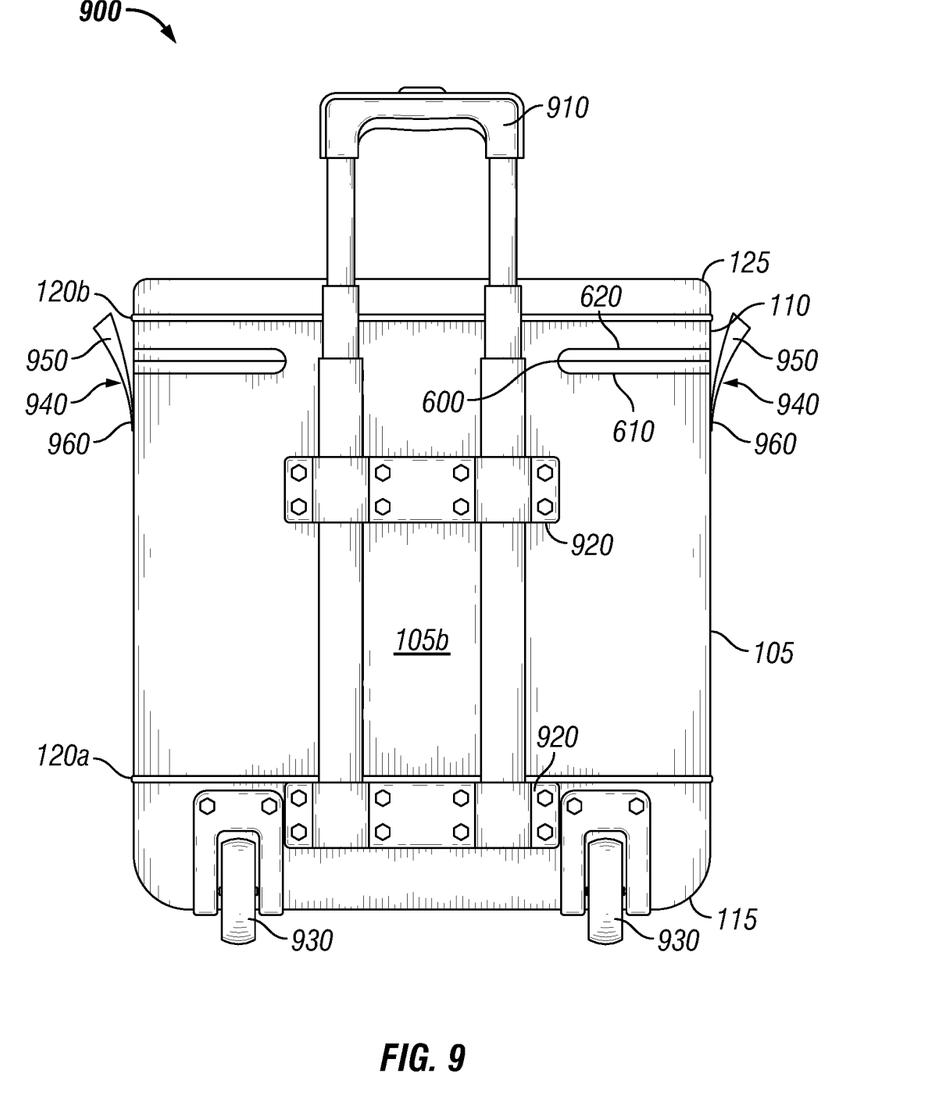
FIG. 9 illustrates a rear plan view of another embodiment of a cooler constructed in accordance with the disclosed principles.

Referring now to FIG. 9, illustrated is a rear plan view of another embodiment of a cooler 900 constructed in accordance with the disclosed principles. In this embodiment, the cooler 900 again includes body 105 and lid 110, as well as a rigid base 115 and a rigid top 125 connected to the body 105 and lid 110, respectively. Additionally, the cooler 900 again includes a first sealing strip 120a joining the base 115 to the lower edge of the body 105, and a second sealing strip 120b joining the top 125 to the upper edge of the lid 110. As discussed in detail above, the sealing strips 120a, 120b are heat welded to the soft thermoplastic materials comprising the body 105 and lid 110, and sewn to the rigid materials comprising the base 115 and top 125.

This embodiment of cooler 900 as disclosed herein now includes an elongated handle 910. In exemplary embodiments, the handle 910 may be telescopic so that it can be extended upwards for ease of use by a user, and then collapsed to a downward, stowed position for better concealment of the handle 910, as well as to move the handle 910 from potentially being an obstruction to the lid 110 as it is fully opened. The handle 910 may be permanently affixed to the back wall 105b of the body 105. In the illustrated embodiment, brackets 920 are used to firmly secure the handle 910 to the back wall 105b of the cooler 900. Moreover, in some embodiments, the brackets 920 may be removable, or may instead simply be openable, so as to make the handle 910 removable from the cooler 900, if desired. While a lower bracket 920 may be firmly secured to the rigid material of the base 115, the upper bracket 920 may be fastened to an optional corresponding internal bracket 920a (shown in broken line) so as to similarly firmly secure the upper bracket 920. Also, the handle 910 may be more firmly secured to cooler embodiments having the internal rigid support structure discussed above, where the brackets 920 may be secured to the back wall of the support structure, or, alternatively, the lower bracket 920 secured to the rigid base 115 and the upper bracket 920 alone secured to such an internal support structure. Of course, other techniques for securing the handle 910 to an exemplary cooler 900 may also be employed.

Additionally, embodiments of a cooler 900 as disclosed herein may include wheels 930 to assist with the mobility of the cooler 900. For example, two wheels 930 may be attached to and extend downward from the rigid base 115. By affixing the wheels 930 to the rigid base 115, the structural strength of the wheels 930 with respect to the remainder of the cooler 900 is increased. In such embodiments, the handle 910 may be raised into the extended position and the cooler 900 tiled back such that only the two wheels 930 remain in contact with the ground. A user may then roll the cooler 900 on the wheels 930 in a manner similar to a two-wheeled dolly. In other embodiments, three or four wheels 930 may be attached to and extend downward from the rigid base 115 so that the cooler 900 may be rolled on all wheels 930 in a manner similar to a cart. In such embodiments, one or more of the wheels 930 may be configured to rotate independently, thereby further assisting with the mobility of the cooler 900. In yet other embodiments, the wheels 930 of the cooler 900 may be removable and replaceable, for example, in case of damage or simply excess wear.

Further embodiments of a cooler constructed as disclosed herein, such as the cooler 900 in FIG. 9, may also include carry handles. Specifically, handle structures 940 may be attached to the side walls 105c, 105d of the body 105. Each handle structure 940 may be comprised of a handle 950 connected to a handle mount 960. The handles 950 may be formed of either a rigid or soft material, and may even include padding on the grasping areas of the handles 950 for increased comfort for a user. The handles 950 may be affixed to the handle mounts 960 through any desirable technique, such as sewing the two together, bonding, or any other securing technique. In exemplary embodiments, the handle mounts 960 may be comprised of soft thermoplastic material, and H/F heat welded to the soft thermoplastic material of the body side walls 105c, 105d; however, in other embodiments the handle mounts 960 may be secured to the body 105 of the cooler 900 using fasteners or another securing technique. Moreover, the handle structures 960 may be more firmly secured to cooler embodiments having the internal rigid support structure discussed above, where the handle structures 960 are secured to the side walls of the support structure.

While this invention has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that certain technology is prior art to any embodiment(s) in this disclosure. Neither is the "Brief Summary of the Invention" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

I claim:

1. An insulated cooler, comprising:
   a body, comprising:
   a front wall and a back wall, and opposing body side walls connecting the body front wall to the body back wall, wherein the body front, back and side walls each comprise soft thermoplastic; and
   a base comprising rigid plastic connected to bottom edges of the body front, back and side walls with a first thermoplastic sealing strip heat welded to the bottom edges of the body front, back and side walls, and sewn to top edges of the base;

a lid at least partially connected to the body, the lid comprising:

a front wall and a back wall, and opposing lid side walls connecting the lid front wall to the lid back wall, wherein the lid front, back and side walls each comprise soft thermoplastic; and a top comprising rigid plastic connected to top edges of the lid front, back and side walls via a second thermoplastic sealing strip heat welded to the top edges of the lid front, back and side walls, and sewn to bottom edges of the top; and a zipper to closing the lid to the body.

2. An insulated cooler in accordance with claim 1, further comprising a waterproof liner disposed along inner surfaces of the body and the lid.

3. An insulated cooler in accordance with claim 2, wherein the lid further comprises a rigid interior support structure disposed between the waterproof liner and the lid front, back and side walls, the support structure providing a shape for the lid.

4. An insulated cooler in accordance with claim 1, where the zipper further comprises a first side of the zipper is connected to bottom edges of the lid front and side walls, and at least a portion of the lid back wall, and wherein a second side of the zipper is connected to top edges of the body front and side walls, and at least a portion of the body back wall.

5. An insulated cooler in accordance with claim 1, wherein the body further comprises a rigid interior support structure disposed between a liner and the body front, back and side walls, the support structure providing a shape for the body.

6. An insulated cooler in accordance with claim 5, wherein the support structure comprises acrylonitrile butadiene styrene (ABS) plastic.

7. An insulated cooler in accordance with claim 1, wherein the soft thermoplastic comprises thermoplastic polyurethane (TPU).

8. An insulated cooler in accordance with claim 1, wherein the rigid plastic comprises ABS plastic.

9. An insulated cooler in accordance with claim 1, further comprises an insulation disposed between a liner and the body and lid.

10. An insulated cooler in accordance with claim 9, wherein the insulation comprises closed-cell foam.

11. An insulated cooler in accordance with claim 1, wherein the zipper comprises soft rubber bonded along each length of its teeth, wherein said soft rubber on a first side of the zipper is heat welded to the top edges of the body front, back and side walls, and said soft rubber on a second side of the zipper is heat welded to the bottom edges of the lid front, back and side walls.

12. An insulated cooler in accordance with claim 1, further comprising an elongated handle connected to the body back wall, and at least two wheels attached to and extending downward from the base.

13. An insulated cooler in accordance with claim 1, further comprising handle structures each comprising a handle connected to a soft thermoplastic handle mount, a handle mount heat welded to each of the body side walls.

14. A method of manufacturing an insulated bag, the method comprising:

providing a body comprising a front wall and a back wall, and opposing body side walls connecting the body front wall to the body back wall, wherein the body front, back and side walls each comprise soft thermoplastic;

forming a base comprising rigid plastic for connecting to the body;

connecting top edges of the base to bottom edges of the body front, back and side walls using a first thermoplastic sealing strip by:

heat welding one edge of the first thermoplastic sealing strip to the bottom edges of the body front, back and side walls, and sewing a second edge of the first thermoplastic sealing strip to the top edges of the base, wherein the sewing occurs along the second edge of the first thermoplastic sealing strip;

providing a lid at least partially connected to the body, the lid comprising a front wall and a back wall, and opposing lid side walls connecting the lid front wall to the lid back wall, wherein the lid front, back and side walls each comprise soft thermoplastic;

forming a top comprising rigid plastic for connecting to the lid;

connecting bottom edges of the top to top edges of the lid front, back and side walls using a second thermoplastic sealing strip by:

heat welding one edge of the second thermoplastic sealing strip to the top edges of the lid front, back and side walls, and sewing a second edge of the second thermoplastic sealing strip to the bottom edges of the top, wherein the sewing occurs along the second edge of the second thermoplastic sealing strip; and closing the lid to the body using a zipper.

15. The method of claim 14, wherein the sewing of the first thermoplastic sealing strip occurs along a channel having a wall on a first side of the channel.

16. The method of claim 15, wherein the channel has a second wall on a second side of the channel opposite the first side of the channel.

17. The method of claim 15, further comprising disposing a rigid interior support structure between a liner and the body.

18. The method of claim 14, wherein the sewing of the second thermoplastic sealing strip occurs along a channel having a wall on a first side of the channel.

19. The method of claim 18, wherein the channel has a second wall on a second side of the channel opposite the first side of the channel.

20. The method of claim 14, further comprising disposing a waterproof liner along inner surfaces of the body and the lid.

* * * * *